(12) United States Patent
Gaulocher et al.

(10) Patent No.: US 8,364,459 B2
(45) Date of Patent: Jan. 29, 2013

(54) METHOD FOR ESTIMATING STATES OF A POWER ELECTRONIC SYSTEM

(75) Inventors: Sebastian Gaulocher, Zofingen (CH); Georgios Papafotiou, Adliswil (CH)

(73) Assignee: ABB Research Ltd., Zurich (CH)

( * ) Notice: Subject to any disclaimer, the term of this patent is extended or adjusted under 35 U.S.C. 154(b) by 651 days.

(21) Appl. No.: 12/558,148

(22) Filed: Sep. 11, 2009

(65) Prior Publication Data

US 2010/0070247 A1 Mar. 18, 2010

(30) Foreign Application Priority Data

Sep. 11, 2008 (EP) ..................... 08164149

(51) Int. Cl.
*G06F 17/50* (2006.01)
(52) U.S. Cl. .......................................... 703/14; 716/109
(58) Field of Classification Search .................. 703/1, 14
See application file for complete search history.

(56) References Cited

U.S. PATENT DOCUMENTS

| | | | |
|---|---|---|---|
| 2003/0026111 A1 | 2/2003 | Steimer et al. | |
| 2004/0064735 A1* | 4/2004 | Frazier et al. | 713/201 |
| 2006/0125435 A1 | 6/2006 | Geyer et al. | |

FOREIGN PATENT DOCUMENTS

| | | |
|---|---|---|
| DE | 19751375 A1 | 5/1999 |
| EP | 1253706 A | 10/2002 |
| EP | 1670135 A1 | 6/2006 |

OTHER PUBLICATIONS

Thomas F. Edgar (State Estimation Usign Kalman Filter, 2006).*
Slobodan Pajic, (Power System State Estimation and Contingency Constrained Optimal Power Flow—A Numerically Robust Implementation, 2007).*
European Search Report for EP 08164149.0 completed Mar. 18, 2009.
Bogosyan S et al., "Braided extended Kalman filters for sensorless estimation in induction motors at high-low/zero speed", IET Control Theory Appl, pp. 987-998, vol. 1, No. 4, Jul. 2007.

* cited by examiner

*Primary Examiner* — Dwin M Craig
*Assistant Examiner* — Andre Pierre Louis
(74) *Attorney, Agent, or Firm* — Buchanan Ingersoll & Rooney, P.C.

(57) ABSTRACT

A method is disclosed for estimating states of a power electronic system, the system having a converter circuit. An exemplary method includes varying a system state vector $x(k)$ and a system state vector $x(k+1)$ for each of sampling times $k=-N+1$ to $k=0$ in such a manner that a sum formed by an addition of a first vector norm obtained by subtracting a first system model function $f(x(k), u(k))$ from the system state vector $x(k+1)$, and another vector norm obtained by subtracting a second system model function $g(x(k), u(k))$ from the output variable vector $y(k)$, becomes minimal over the sampling times $k=-N+1$ to $k=0$. A desired system state vector $x(k)$ at the sampling time $k=0$ can then be selected.

12 Claims, 1 Drawing Sheet

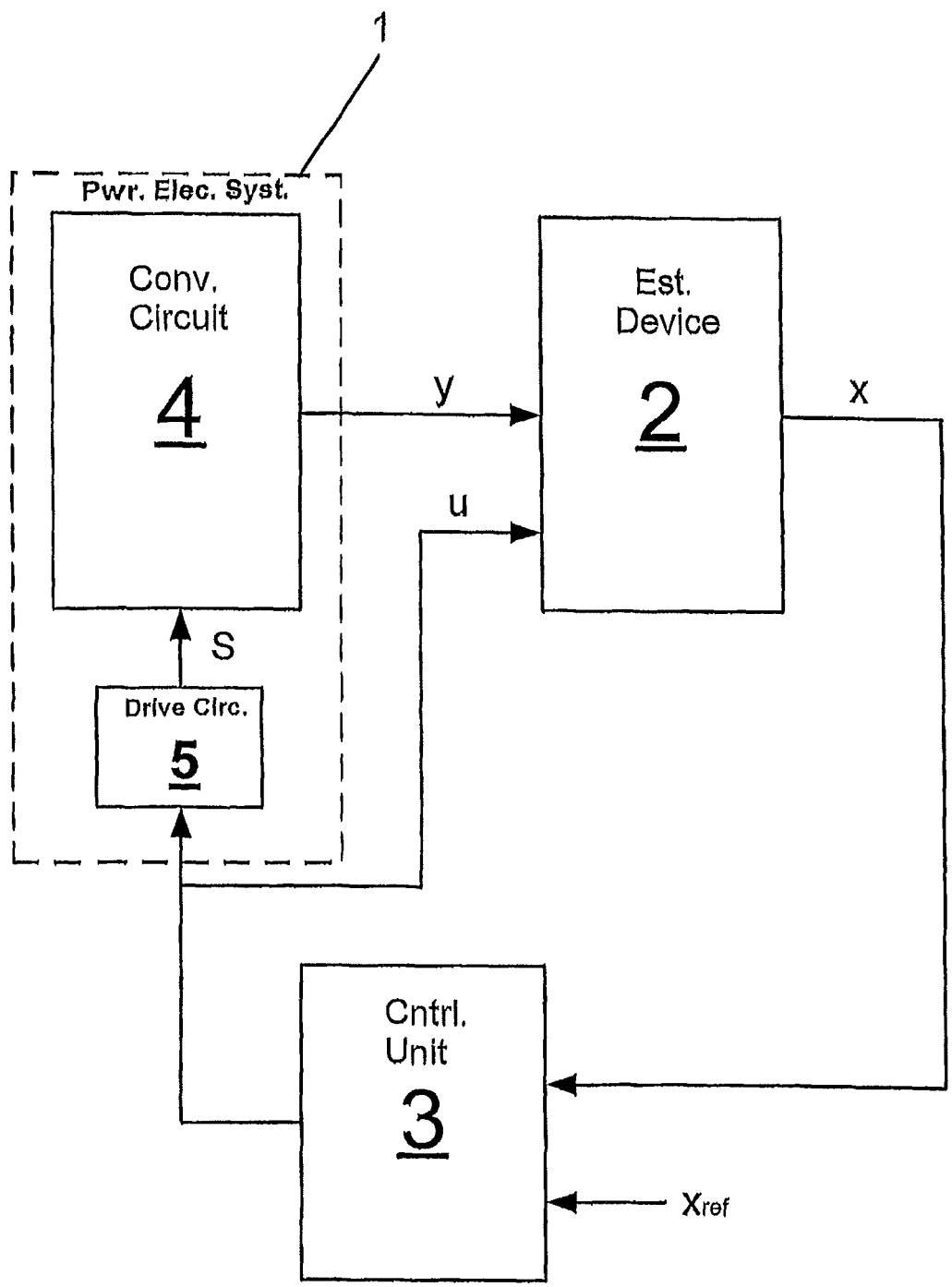

METHOD FOR ESTIMATING STATES OF A POWER ELECTRONIC SYSTEM

RELATED APPLICATION

This application claims priority under 35 U.S.C. §119 to European Patent Application No. 08164149.0 filed in Europe on Sep. 11, 2008, the entire content of which is hereby incorporated by reference in its entirety.

FIELD

The disclosure relates to the field of estimation methods in control engineering.

BACKGROUND INFORMATION

Power electronic systems are used in many applications. Such a power electronic system can include a converter circuit having a multiplicity of driveable power semiconductor switches and an associated drive circuit for the driveable power semiconductor circuit. One or more loads which can, however, vary greatly over time, for example as a result of faults, can be connected to the converter circuit. Such a load may be, for example, one or more motors, or any electrical load. States of the power electronic system, for example an inductive load current and a capacitive load voltage, can be specifically affected by such variations and may be detected with difficulty, that is to say with a considerable amount of effort, or not at all, for example by measurement.

It is thus known to estimate states of the power electronic system, the estimated states then being able to be processed further in a control unit. A known method for estimating states in a power electronic system is the use of a time-discrete Kalman filter, as is stated, for example, in "Braided extended Kalman filters for sensorless estimation in induction motors at high-low/zero speed", IET Control Theory, Appl., 2007. To estimate states, for example using a time-discrete Kalman filter, the following method steps are first effected:

(a) determination of output variable vectors y(k) for the sampling times k=−N+1 to k=0, where N is a predefinable sampling horizon and y is an output variable, for example the converter output voltage, which can be determined by measurement, for example, (b) determination of manipulated variable vectors u(k) for the sampling times k=−N+1 to k=0, where the manipulated variable is, for example, the control factor of the converter circuit, (c) determination of a first system model function f(x(k), u(k)) at the sampling time k for describing the power electronic system, which function is dependent on the manipulated variable vector u(k) and a system state vector x(k) at the sampling time k, and (d) determination of a second system model function g(x(k), u(k)) at the sampling time k for describing the power electronic system, which function is dependent on the manipulated variable vector u(k) and the system state vector x(k) at the sampling time k.

In using a time-discrete Kalman filter to estimate states x of the power electronic system, the use of secondary conditions of the states (for example the fact that the inductive load current and/or the capacitive load voltage is/are limited or may not be negative), can either involve a very large amount of effort, or such conditions cannot be taken into account at all. System model functions f(x(k), u(k)), g(x(k), u(k)) for the Kalman filter which are piecewise affine-linear and describe a given power electronic system either cannot be taken into account, or can involve a very large amount of expenditure during estimation by the time-discrete Kalman filter.

SUMMARY

A method for estimating states of a power electronic system is disclosed having a converter circuit, the method comprising:

(a) determining output variable vectors y(k) for sampling times k=−N+1 to k=0, where N is a predefinable sampling horizon;

(b) determining manipulated variable vectors u(k) for the sampling times k=−N+1 to k=0;

(c) determining a first system model function f(x(k), u(k)) at the sampling time k for describing the power electronic system, which function is dependent on a manipulated variable vector u(k) and a system state vector x(k) at the sampling time k;

(d) determining a second system model function g(x(k), u(k)) at the sampling time k for describing the power electronic system, which function is dependent on the manipulated variable vector u(k) and the system state vector x(k) at the sampling time k, the system state vector x(k) being estimated at the sampling time k=0 by:

(e) varying the system state vector x(k) and the system state vector x(k+1) for each of the sampling times k=−N+1 to k=0, such that a sum formed by an addition of a first vector norm obtained by subtracting the first system model function f(x(k), u(k)) from the system state vector x(k+1), and another vector norm obtained by subtracting the second system model function from output variable vector y(k), becomes minimal over the sampling times k=−N+1 to k=0; and (f) selecting the system state vector x(k) at the sampling time k=0, wherein:

(g) the first system model function f(x(k), u(k)) and the second system model function g(x(k), u(k)) are each affine-linear.

A method for estimating states of a power electronic system is disclosed having a converter circuit, the method comprising:

(a) determining output variable vectors y(k) for sampling times k=−N+1 to k=0, where N is a predefinable sampling horizon;

(b) determining manipulated variable vectors u(k) for the sampling times k=−N+1 to k=0;

(c) determining a first system model function f(x(k), u(k)) at the sampling time k for describing the power electronic system, which function is dependent on a manipulated variable vector u(k) and a system state vector x(k) at the sampling time k;

(d) determining a second system model function g(x(k), u(k)) at the sampling time k for describing the power electronic system, which function is dependent on the manipulated variable vector u(k) and the system state vector x(k) at the sampling time k, the system state vector x(k) being estimated at the sampling time k=0 by:

(e) varying the system state vector x(k) and the system state vector x(k+1) for each of the sampling times k=−N+1 to k=0, such that a sum formed by an addition of a first vector norm obtained by subtracting the first system model function f(x(k), u(k)) from the system state vector x(k+1), and another vector norm obtained by subtracting the second system model function from the output variable vector y(k), becomes minimal over the sampling times k=−N+1 to k=0; and (f) selecting the system state vector x(k) at the sampling time k=0, wherein:
(g) the first system model function f(x(k), u(k)) and the second system model function g(x(k), u(k)) are each piecewise affine-linear.

BRIEF DESCRIPTION OF THE DRAWINGS

These and other objects, advantages and features of the present disclosure become clear from the following detailed description of exemplary embodiments of the disclosure in conjunction with the drawing.

In the drawing:

FIG. 1 shows an exemplary embodiment of a structure of a power electronic system having a control unit and an estimation device which estimates states of the power electronic system in a manner as disclosed herein.

Reference symbols used in the drawing and the meaning thereof are summarized in the list of reference symbols. In principle, the same parts are provided with the same reference symbols in the figure. The embodiments described are examples of the subject matter of the disclosure, without restriction.

DETAILED DESCRIPTION

An exemplary method for estimating states of a power electronic system as disclosed herein allows states to be estimated for a wide range of power electronic systems and can be implemented in a simple manner.

An exemplary power electronic system includes a converter circuit. The exemplary method for estimating states of the power electronic system includes the following steps:
(a) determining an output variable vector y(k) for sampling times k=−N+1 to k=0, where N is a predefinable sampling horizon;
(b) determining a manipulated variable vector u(k) for the sampling times k=−N+1 to k=0;
(c) determining a first system model function f(x(k), u(k)) at the sampling time k for describing the power electronic system, which function is dependent on a manipulated variable vector u(k) and a system state vector x(k) at the sampling time k; and
(d) determining a second system model function g(x(k), u(k)) at the sampling time k for describing the power electronic system, which function is dependent on the manipulated variable vector u(k) and the system state vector x(k) at the sampling time k.

According to the disclosure, a system state vector x(k) is, for example, estimated at the sampling time k=0 in the following exemplary steps:
(e) varying the system state vector x(k) and the system state vector x(k+1) for each of the sampling times k=−N+1 to k=0, such that a sum formed by an addition of a first vector norm obtained by subtracting the first system model function f(x(k), u(k)) from a system state vector x(k+1), and another vector norm obtained by subtracting the second system model function g(x(k), u(k)) from the output variable vector y(k), becomes minimal over the sampling times k=−N+1 to k=0; and
(f) selecting of the system state vector x(k) at the sampling time k=0;
(g) wherein the first system model function f(x(k), u(k)) and the second system model function g(x(k), u(k)) are each affine-linear or alternatively piecewise affine-linear.

Desired estimated states at the current time k=0 can be included as vector elements of the system state vector x(k) at the sampling time k=0, that is to say in the system state vector x(0). An exemplary method as disclosed herein can allow secondary conditions which are piecewise affine-linear relationships between the states and inputs to be taken into account without any problems when estimating the states. If the power electronic system can be described by piecewise affine-linear system model functions f(x(k), u(k)), g(x(k), u(k)), such system model functions f(x(k), u(k)), g(x(k), u(k)) can likewise be taken into account in a very simple manner when estimating the states. Overall, methods as disclosed herein can allow states to be estimated for an extremely wide range of power electronic systems and can also be implemented in a very simple manner.

FIG. 1 shows an exemplary embodiment of a structure of a power electronic system 1 having a control unit 3 and an estimation device 2 which estimates the states x of the power electronic system 1 in a manner as disclosed herein. One or more loads which can be connected to the power electronic system 1 are not illustrated in FIG. 1 for the sake of clarity. The power electronic system 1 includes a converter circuit 4 having a multiplicity of driveable power semiconductor switches and an associated drive circuit 5 for driving the driveable power semiconductors using a drive signal S. Such a drive circuit 5 can use pulse width modulation, for example, to generate the drive signal S from the manipulated variable u which is, for example, a control factor of the converter circuit. An output variable y of the power electronic system 1 according to FIG. 1 is, for example, the converter output voltage which can be determined by measurement, for example. The structure shown in FIG. 1 can also have the estimation device 2 to estimate states x of the power electronic system 1 in a manner as disclosed herein. States x of the power electronic system which can be estimated are, for example, an inductive load current and a capacitive load voltage.

An exemplary method will now be discussed in detail. In a step (a), one or more output variable vectors y(k) can be determined for the sampling times k=−N+1 to k=0, where N is a predefinable sampling horizon. The elements of the output variable vectors y(k) can be the output variables y, for example converter output voltages which are determined by measurement for the sampling times k=−N+1 to k=0.

In a step (b), manipulated variable vectors u(k) can be determined for the sampling times k=−N+1 to k=0, where the elements of the manipulated variable vectors u(k) are the manipulated variables u for the sampling times k=−N+1 to k=0, for example the control factors.

In a step (c), a first system model function f(x(k), u(k)) can be determined at the sampling time k for describing the power electronic system 1, which function is dependent on the manipulated variable vector u(k) and a system state vector x(k) at the sampling time k.

In a step (d), a second system model function g(x(k), u(k)) can be determined at the sampling time k for describing the power electronic system 1, which function is dependent on the manipulated variable vector u(k) and the output variable vector x(k) at the sampling time k.

The first system model function f(x(k), u(k)) at the sampling time k for describing the power electronic system 1 can, for example, generally be determined as follows:

$$f(x(k), u(k)) = \begin{cases} A_1 x(k) + B_1 u(k) + v_1, & F_1 x(k) + E_1 u(k) \leq G_1 \\ A_2 x(k) + B_2 u(k) + v_2, & F_2 x(k) + E_2 u(k) \leq G_2 \\ \ldots \\ A_M x(k) + B_M u(k) + v_M, & F_M x(k) + E_M u(k) \leq G_M, \end{cases}$$

where $A_1 \ldots A_M$, $B_1 \ldots B_M$, $F_1 \ldots F_M$ and $E_1 \ldots E_M$ are matrices, $v_1 \ldots v_M$ are vectors, and the vectors $G_1$ and $G_2$ are limits which define the first system model function f(x(k), u(k)) as affine-linear or piecewise affine-linear. A continuously affine-linear function can also be achieved by appropriately selecting the vectors $G_1 \ldots G_M$ and $v_1 \ldots v_M$ and matrices $A_1 \ldots A_M, B_1 \ldots B_M, F_1 \ldots F_M, E_1 \ldots E_M$ if the power electronic system can be described in such a manner.

The second system model function $g(x(k), u(k))$ at the sampling time k for describing the power electronic system 1 can, for example, generally be determined as follows:

$$g(x(k), u(k)) = \begin{cases} C_1 x(k) + D_1 u(k) + w_1, F_1 x(k) + E_1 u(k) \leq G_1 \\ C_2 x(k) + D_2 u(k) + w_2, F_2 x(k) + E_2 u(k) \leq G_2 \\ \ldots \\ C_M x(k) + D_M u(k) + w_M, F_M x(k) + E_M u(k) \leq G_M, \end{cases}$$

where $C_1 \ldots C_M, D_1 \ldots D_M, F_1 \ldots F_M, E_1 \ldots E_M$ are matrices, $w_1 \ldots w_M$ are vectors, and the vectors $G_1$ and $G_2$ are limits which likewise define the second system model function $g(x(k), u(k))$ as affine-linear or piecewise affine-linear. A continuously affine-linear function can also be achieved by appropriately selecting the vectors $G_1 \ldots G_M$ and $w_1 \ldots w_M$ and matrices $C_1 \ldots C_M, D_1 \ldots D_M, F_1 \ldots F_M, E_1 \ldots E_M$ if the power electronic system can be described in such a manner.

According to the disclosure, a system state vector $x(k)$ can be estimated at the sampling time k=0, that is to say at the current time, in the exemplary steps described below:

(e) varying the system state vector $x(k)$ and the system state vector $x(k+1)$ for each of the sampling times $k=-N+1$ to $k=0$, such that a sum formed by an addition of a first vector norm, obtained by subtracting the first system model function $f(x(k), u(k))$ from a system state vector $x(k+1)$, and another vector norm, obtained by subtracting the second system model function $g(x(k), u(k))$ from the output variable vector $y(k)$, becomes minimal over the sampling times $k=-N+1$ to $k=0$; and (f) selecting of the system state vector $x(k)$ at the sampling time $k=0$.

Desired estimated states x at the current time $k=0$ can be included as vector elements of the system state vector $x(k)$ at the sampling time $k=0$, that is to say in the system state vector $x(0)$. These vector elements can be, by way of example, the inductive load current and the capacitive load voltage at the sampling time $k=0$. An exemplary method disclosed herein can allow secondary conditions of the states x to be taken into account without difficulty when estimating the states x. If the power electronic system can be described by affine-linear or piecewise affine-linear system model functions $f(x(k), u(k))$, $g(x(k), u(k))$, such system model functions $f(x(k), u(k))$, $g(x(k), u(k))$ can likewise be taken into account in a very simple manner when estimating the states x. The disclosed method can estimate states x for an extremely wide range of power electronic systems 1 and can also be implemented in a very simple manner.

The states x estimated can be processed further in a control unit 3, that is to say adjusted to associated desired states $x_{ref}$, for example. The control unit 3 can, for example, operate according to the model predictive control principle, as is disclosed, for example, in EP 1 670 135 A1, the disclosure of which is hereby incorporated by reference in its entirety. However, any known control principle or any control characteristic can be used.

The sum mentioned above can be described as a sum J according to the exemplary formula mentioned below:

$$J = \sum_{k=-N+1}^{0} \left( \|x(k+1) - f(x(k), u(k))\|_{W_x q} + \|y(k) - g(x(k), u(k))\|_{W_y q} \right),$$

where $W_x$ and $W_y$ are weighting matrices for the state vector $x(k)$ and $x(k+1)$ and for the output variable vector $y(k)$, respectively. The index q specifies the selectable vector norm.

An absolute value sum norm can, for example, be selected as vector norm by subtracting, from the system state vector $x(k+1)$, the first system model function $f(x(k), u(k))$, that is to say for the expression:

$$\|x(k+1) - f(x(k), u(k))\|_{W_x q},$$

where q=1.

Another absolute value sum norm can, for example, be selected as a vector norm obtained by subtracting the second system model function $g(x(k), u(k))$ from the output variable vector $y(k)$ according to the expression:

$$\|y(k) - g(x(k), u(k))\|_{W_y q},$$

where q=1 too. The absolute value sum norm, that is to say q=1, can, for example, be realized in a very simple manner.

Alternatively, the Euclidean norm, that is to say q=2, can be respectively selected as a first vector norm obtained by subtracting the first system model function $f(x(k), u(k))$ from the system state vector $x(k+1)$, and as another vector norm obtained by subtracting the second system model function $g(x(k), u(k))$ from the output variable vector $y(k)$.

As a further exemplary alternative, a maximum norm, that is to say $q=\infty$, can be respectively selected as a vector norm obtained by subtracting the first system model function $f(x(k), u(k))$ from the system state vector $x(k+1)$ and as another vector norm obtained by subtracting the second system model function $g(x(k), u(k))$ from the output variable vector $y(k)$.

Other norms can also be used. For example, norms for the individual subtractions can be selected differently. For example, the absolute value sum norm, where q=1, can be selected as a vector norm obtained by subtracting the first system model function $f(x(k), u(k))$ from the system state vector $x(k+1)$, whereas the Euclidean norm, that is to say q=2, can be selected as a vector norm obtained by subtracting the second system model function $g(x(k), u(k))$ from the output variable vector $y(k)$. Any and all combinations can also be used.

As already described above, the system state vector $x(k)$ and the system state vector $x(k+1)$ can be varied for each of the sampling times $k=-N+1$ to $k=0$ in such a manner that the sum J becomes minimal over the sampling times $k=-N+1$ to $k=0$. These variations in the system state vector $x(k)$ and the system state vector $x(k+1)$ for each of the sampling times $k=-N+1$ to $k=0$ can be stored in a table (look-up table). A system state vector $x(k)$ and a system state vector $x(k+1)$ can be allocated to each output variable vector $y(k)$ and manipulated variable vector $u(k)$ for each of the sampling times $k=-N+1$ to $k=0$. The desired system state vector $x(k)$ at the sampling time $k=0$, that is to say the system state vector $x(0)$, can be read from the table. The vector elements of the system state vector $x(0)$ can be the desired estimated states x at the current time $k=0$. This table can be created in advance, that is to say offline, such that no computation-intensive calculation has to be carried out online during variation with, for example, the criterion that the sum J becomes minimal. The table mentioned above can, for example, be stored in the estimation device 2 or on a separate storage medium which is then accessed by the estimation device 2.

If, in contrast, there are sufficient computation power resources, for example as a result of a processor, such as a digital signal processor, the variations in the system state vector $x(k)$ and the system state vector $x(k+1)$ for each of the sampling times $k=-N+1$ to $k=0$ can be calculated continuously (e.g., online).

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Power electronic system
2 Estimation device
3 Control unit
4 Converter circuit
5 Drive circuit

What is claimed is:

1. A method for estimating states of a power electronic system having a converter circuit, the method comprising:
   (a) determining, by a computing device having a processor, output variable vectors y(k) for sampling times k=−N+1 to k=0, where N is a predefinable sampling horizon;
   (b) determining, by the processor, manipulated variable vectors u(k) for the sampling times k=−N+1 to k=0;
   (c) determining a first system model function f(x(k), u(k)) at the sampling time k for describing the power electronic system, which function is dependent on a manipulated variable vector u(k) and a system state vector x(k) at the sampling time k;
   (d) determining a second system model function g(x(k), u(k)) at the sampling time k for describing the power electronic system, which function is dependent on the manipulated variable vector u(k) and the system state vector x(k) at the sampling time k, the system state vector x(k) being estimated at the sampling time k=0 by:
   (e) varying the system state vector x(k) and a system state vector x(k+1) for each of the sampling times k=−N+1 to k=0, such that a sum formed by an addition of a first vector norm obtained by subtracting the first system model function f(x(k), u(k)) from the system state vector x(k+1), and another vector norm obtained by subtracting the second system model function from an output variable vector y(k) for a sampling time k in −N+1 to k=0, becomes minimal over the sampling times k=−N+1 to k=0; and
   (f) selecting the system state vector x(k) at the sampling time k=0 to estimate a state of the power electronic system, wherein
      (g) the first system model function f(x(k), u(k)) and the second system model function g(x(k), u(k)) are each affine-linear.

2. The method as claimed in claim 1, comprising:
selecting a first absolute value sum norm using the first vector norm obtained by subtracting the first system model function f(x(k), u(k)) from the system state vector x(k+1); and
obtaining another absolute value sum norm using the another vector norm obtained by subtracting the second system model function g(x(k),u(k)) from the output variable vector y(k).

3. The method as claimed in claim 1, comprising selecting:
a first Euclidean norm using the first vector norm; and
another Euclidean norm using the another vector norm.

4. The method as claimed in claim 1, comprising:
selecting a first maximum norm using the first vector norm, and another maximum is selected using the another vector norm obtained by subtracting a right-hand side of the second system model function g(x(k),u(k)) from the output variable vector y(k).

5. The method as claimed in claim 1, comprising:
storing variations of the system state vector x(k) and the system state vector x(k+1) for each of the sampling times k=−N+1 to k=0 in an allocation table, a system state vector x(k) and a system state vector x(k+1) being allocated to each output variable vector y(k) and manipulated variable vector u(k) for each of the sampling times k=−N+1 to k=0.

6. The method as claimed in claim 1, comprising:
calculating, by the computing device, variations in the system state vector x(k) and the system state vector x(k+1) for each of the sampling times k=−N+1 to k=0 continuously.

7. A method for estimating states of a power electronic system having a converter circuit, the method comprising:
   (a) determining, by an estimation device, output variable vectors y(k) for sampling times k=−N+1 to k=0, where N is a predefinable sampling horizon;
   (b) determining, by a processor of the estimation device, manipulated variable vectors u(k) for the sampling times k=−N+1 to k=0;
   (c) determining a first system model function f(x(k), u(k)) at the sampling time k for describing the power electronic system, which function is dependent on a manipulated variable vector u(k) and a system state vector x(k) at the sampling time k;
   (d) determining a second system model function g(x(k), u(k)) at the sampling time k for describing the power electronic system, which function is dependent on the manipulated variable vector u(k) and the system state vector x(k) at the sampling time k, the system state vector x(k) being estimated at the sampling time k=0 by:
   (e) varying the system state vector x(k) and a system state vector x(k+1) for each of the sampling times k=−N+1 to k=0, such that a sum formed by an addition of a first vector norm obtained by subtracting the first system model function f(x(k), u(k)) from the system state vector x(k+1), and another vector norm obtained by subtracting the second system model function from an output variable vector y(k) for a sampling time k in −N+1 to k=0, becomes minimal over the sampling times k=−N+1 to k=0; and
   (f) selecting the system state vector x(k) at the sampling time k=0 to estimate the state of the power electronic system, wherein
      (g) the first system model function f(x(k), u(k)) and the second system model function g(x(k), u(k)) are each piecewise affine-linear.

8. The method as claimed in claim 7, comprising:
selecting a first absolute value sum norm using the first vector norm obtained by subtracting the first system model function f(x(k), u(k)) from the system state vector x(k+1); and
obtaining another absolute value sum norm using the another vector norm obtained by subtracting the second system model function g(x(k),u(k)) from the output variable vector y(k).

9. The method as claimed in claim 7, comprising selecting:
a first Euclidean norm using the first vector norm; and
another Euclidean norm using the another vector norm.

10. The method as claimed in claim 7, comprising selecting:
a first maximum norm using the first vector norm; and
another maximum using the another vector norm obtained by subtracting a right-hand side of the second system model function g(x(k),u(k)) from the output variable vector y(k).

11. The method as claimed in claim 7, comprising:
storing variations of the system state vector x(k) and the system state vector x(k+1) for each of the sampling times k=−N+1 to k=0 in an allocation table, a system state vector x(k) and a system state vector x(k+1) being allocated to each output variable vector y(k) and manipulated variable vector u(k) for each of the sampling times k=−N+1 to k=0.

12. The method as claimed in claim 7, comprising:
calculating, by the computing device, variations in the system state vector x(k) and the system state ector x(k+1) for each of the sampling times k=−N1 to k=0 continuously.

\* \* \* \* \*